US006536121B1

(12) United States Patent
Ishikawa et al.

(10) Patent No.: US 6,536,121 B1
(45) Date of Patent: Mar. 25, 2003

(54) SCRIBING APPARATUS

(75) Inventors: Hirokazu Ishikawa, Tokyo-to (JP); Gyo Shimotoyodome, Tokyo-to (JP)

(73) Assignees: THK Co., Ltd., Tokyo-to (JP); Beldex Corporation, Tokyo-to (JP)

( * ) Notice: Subject to any disclaimer, the term of this patent is extended or adjusted under 35 U.S.C. 154(b) by 0 days.

(21) Appl. No.: 09/631,687

(22) Filed: Aug. 2, 2000

(30) Foreign Application Priority Data

Aug. 6, 1999 (JP) ........................................... 11-223546
Dec. 27, 1999 (JP) ........................................... 11-369419

(51) Int. Cl.$^7$ ............................................. B43L 13/00
(52) U.S. Cl. ............................. 33/18.1; 83/881; 225/96
(58) Field of Search ........................ 83/880, 879, 881, 83/74, 76.8; 225/94, 96; 33/18.1, 27.01, 32.1, DIG. 1, DIG. 2

(56) References Cited

U.S. PATENT DOCUMENTS

| | | | |
|---|---|---|---|
| 2,697,281 A | * 12/1954 | Watson ................. 33/DIG. 1 X |
| 3,122,953 A | 3/1964 | Atkeson ....................... 83/880 |
| 3,753,384 A | * 8/1973 | Anfindsen ................. 33/18.1 X |
| 4,319,400 A | * 3/1982 | Chung ................. 33/DIG. 1 X |
| 4,426,783 A | * 1/1984 | Gerber et al. ............. 33/32.1 X |
| 4,451,985 A | * 6/1984 | Pullman ....................... 33/18.1 |
| 4,601,111 A | * 7/1986 | Berchtold ............ 33/DIG. 1 X |
| 5,005,297 A | * 4/1991 | Aehnelt et al. ...... 33/DIG. 1 X |
| 5,012,584 A | * 5/1991 | Galan et al. ................. 33/18.1 |
| 5,174,039 A | * 12/1992 | Murai ................. 33/DIG. 2 X |
| 5,512,808 A | * 4/1996 | Clark, Jr. et al. ........ 83/76.8 X |
| 5,820,006 A | * 10/1998 | Turner ......................... 225/96 |
| 5,848,477 A | * 12/1998 | Wiedmann et al. .. 33/DIG. 1 X |
| 6,032,558 A | * 3/2000 | Michler ......................... 83/74 |
| 6,256,898 B1 | * 7/2001 | Trionfetti ............. 33/DIG. 1 X |

FOREIGN PATENT DOCUMENTS

EP        0 905 097 A1       3/1999

\* cited by examiner

*Primary Examiner*—Charles Goodman
(74) *Attorney, Agent, or Firm*—Armstrong, Westerman & Hattori, LLP (57) ABSTRACT

A scribing apparatus which forms a scribe line on a work 100 comprises a scribe body 10 having a cutter 13 put on the work 100 and a vibration generation member 14 which vibrates the cutter 13 in a direction perpendicular to the work 100 periodically, a support device having a support body 20 for supporting the scribe body 10 to be movable, and magnetic force applying means 40 for holding the scribe body 10 at a standard height in the direction by using magnetic force. The magnetic force applying means 40 includes a pair of magnets 41a, 41b and a pair of magnets 42a, 42b repulsing each other in a direction parallel to a direction in which the vibration generation member 14 vibrates. And magnetically repelling force applied to the scribe body 10 by said first pair of magnets 41a, 41b and magnetically repelling force applied to the scribe body 10 by said second pair of magnets 42a, 42b oppose to each other.

5 Claims, 7 Drawing Sheets

PRIOR ART

SCRIBING APPARATUS

BACKGROUND OF THE INVENTION

The present invention relates to a scribing apparatus for forming a scribe line on a surface of a work (workpiece) made of a hard brittle material such as plate glass, ceramics plate, a semiconductor or the like.

A scribe apparatus which forms a scribe line on the work surface while applying vibrations to a cutter is conventionally known. This scribing apparatus has a vibration generation member generating a vibration in a scribe body, and the scribing apparatus vibrates the cutter disposed on a lower end of the scribe body. When the cutter stays in contact with the work surface, the scribe body vibrates without changing a position of the cutter. Therefore a pressure applied to the work by the cutter vibrates periodically, and a deep vertical cracks is generated on the work surface in a work thickness direction.

In the known scribe apparatus, when the scribe body is vibrated, it is likely that the cutter will be bounced off the work surface and can not stay in contact with the work surface. As a result, damage such as horizontal (lateral) cracks or the like are generated and fin g vertical cracks are not formed on the work surface. In order to solve this problem, the Japanese Patent Laid-open Publication No. HEI 9-278473 discloses an scribing apparatus which applies a static load to the work by using a plate spring or making the weight of the scribe body heavier so as to prevent the cutter from being bounced off the work surface.

Figure 9:
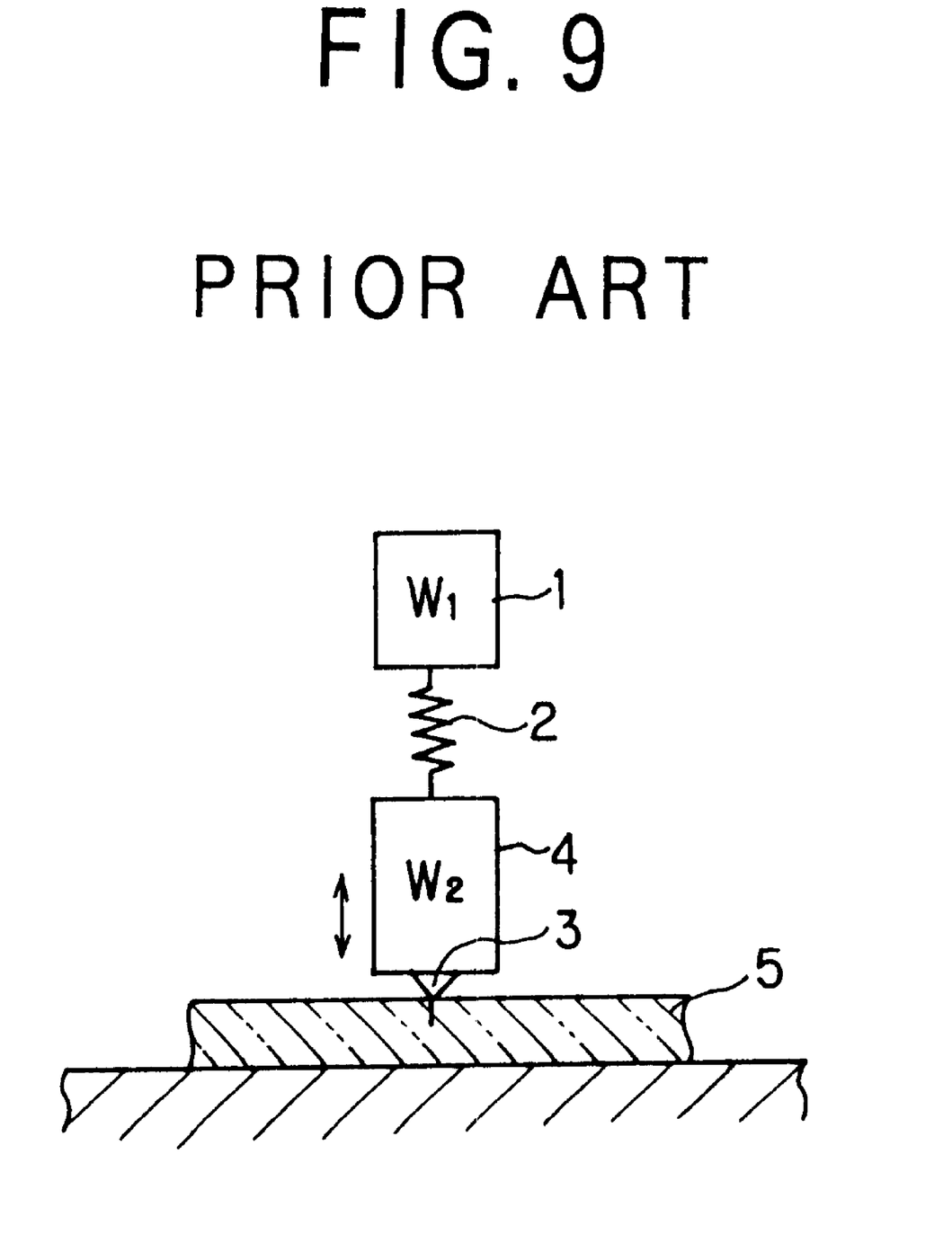
FIG. 9 is a schematic side view showing a structure of a scribing apparatus in the prior art.

Also, as shown in FIG. 9, inventors propose a scribe apparatus that prevent a cutter from being bounced off a work surface by using a weight 1 and a spring 2 (the Japanese Patent Laid-open Publication No. HEI 11-157860). In this scribe apparatus, the weight 1 is provided above the scribe body 4 through the spring 2, and gravity of the weight 1 applied to the scribe body 4 prevent the cutter 3 from being bounced off the work 5. Total gravity of mass W1 of the weight 1 and mass W2 of the scribe body 2 are given to the work 5 as a static load.

However, in a way of applying the static load to the work by making the weight of the scribe body heavier, since the static load applied to the work becomes excessive, a horizontal cracks are most likely generated near the scribe line on the surface of the work. Conversely, if the static load is too underestimated, the cutter will be bounded off the work surface, and continuous micro-cracks will not be secured.

Also, in a way of applying the static load to the work by using a plate spring, resonance will be easy to occur between the scribe body and the plate spring, so the scribe line will not be formed under a certain condition of a frequency of the vibration generation member or a material of the work.

Further in the scribe method in the Japanese Patent Laid-open Publication No. HEI 11-157860, if a frequency of the vibration generation member frequency is close to a natural frequency in a system of the spring 2 and the weight 1, the weight 1 will resonate, and an undesirable elastic load will be applied to the scribe body 4 by the spring 2. Also, since the weight 1 is provided, the static load applied to the work 5 from the cutter 3 becomes larger, damage such as horizontal cracks is occurred on the surface of the work 5. Further, if the scribe body 4 and the weight 1 are not guided sufficiently, the scribe body 4 will totter, and an appropriate dynamic load will not be applied to the work 5.

SUMMARY OF THE INVENTION

An object of the present invention is to substantially eliminate defects or drawbacks encountered in the prior art mentioned above and to provide a scribing apparatus for forming deep vertical cracks along a scribe line without occurring the damage on the work surface. It is another object of the present invention to provide a scribe apparatus of that type which applies an appropriate static and dynamic load to the work from the cutter.

This and other objects can be achieved according to the present invention by providing a scribing apparatus which forms a scribe line on a work, comprising;

a scribe body having a cutter and a vibration generation member which vibrates the cutter periodically;

a support device having a support body for slidably supporting the scribe body to be movable; and a pair of magnets repulsing each other disposed between the support body and the scribe body, wherein the pair of magnets apply a floatage to the scribe body by using magnetically. repelling force.

According to the invention, it is possible to apply an appropriate static load to the work from the cutter. Therefore, scribing apparatus can form deep cracks along a scribe line without occurring a damage on the work surface.

Further, in preferred embodiments, it is further provided with another pair of magnets repulsing each other, one of said another pair of magnets being disposed on the scribe body and another one of said another pair of magnets being disposed on the support body, one of said pair of magnets being disposed on the scribe body and another one of said second pair of magnets being disposed on the support body, and wherein magnetically repelling force applied to the scribe body by said another pair of magnets and magnetically repelling force applied to the scribe body by said pair of magnets opposing to each other in a direction parallel to a direction in which the vibration generation member vibrates.

Further, in preferred embodiments, it is further provided with a magnetic force adjustment mechanism which adjusts magnetically repelling force by changing a position of at least one of the pair of magnets.

Further, in preferred embodiments, one of the pair of magnets is composed of a electromagnet, which adjust magnetically repelling force by changing an impressed electric current of said electromagnet.

Also, to achieve the above object, the inventors thought out that an appropriate dynamic load, can be applied to the work from the cutter by providing a weight which prevent the cutter from floating up in the air, transmitting a load from the weight to the scribe body by using magnetic force, and said weight being to be movable in a vibration direction.

That is the above objects can be achieved according to the present invention by providing, in one aspect, a scribe body having a cutter and a vibration generation member which vibrates the cutter periodically;

a weight applying a load to the scribe body so as to prevent the cutter from floating up in the air;

a load transmission means for transmitting a load from the weight to the scribe body by using magnetic force;

and wherein the weight is to be movable in a direction parallel to a direction in which the vibration generation member vibrates.

According to the scribing apparatus of the above apparatus, since the weight floated by using magnetic force vibrates periodically with the scribe body vibrating periodically, magnetically repelling force seldom changes. Therefore, it is possible to apply an appropriate dynamic force to the work from the work. Also, since a spring connecting the weight with the scribe body directly is not provided, the weight will not resonate. Further, even if the cutter runs on the work, or a thickness of the work changes, or the work is undulated, since the weight moves and follows a movement of the cutter, magnetically repelling force seldom changes in these cases. It is to be noted that the dynamic load is a load applied to the work from the cutter caused by vibration of the scribe body.

In preferred embodiments, said load transmission means is composed of a pair of load applying magnets repulsing each other, one of said load applying magnets being attached to said weight and another one of said load applying magnets being attached to said scribe body.

Further, in preferred embodiment, a spring is disposed between said weight and said load transmission device or between said load transmission device and said scribe body.

According to this aspect of the present invention, since the spring and the load transmission device are connected in series, the vibration of the scribe body will be complex, and it will be possible to apply a complex dynamic load vibrating to the work from the cutter. Therefore, deep vertical cracks can be formed even on the materials such as silicon and so forth that are difficult to be cut with a sine wave.

In preferred embodiment, said spring is composed of a flat spring attached to the weight, and said one of the load applying magnets is attached to the flat spring.

In this structure, it is possible to connect the spring and the load transmission device in series. In return for these, said flat spring may be attached to said scribe body, and said one of the load applying magnets may be attached to said flat spring attached to said scribe body.

In preferred embodiment, the scribing apparatus may further comprise a static load adjustment device adjusting a static load applied to the work from the cutter, when the vibration generation member is static, by using magnetic force. In this embodiment said static load is a load always applied to the work from the cutter, even when the scribe body does not vibrate. And said static load originates in gravity of the scribe body and the weight.

On the occasion of cutting the work made of a hard brittle material, heightening the dynamic load and lowering the static load can form a deep scribe line on the work without damaging the work surface. According to this preferred embodiment, since the scribing apparatus comprises the static load adjustment device adjusting the static load applied to the work from the cutter, it is possible to lower the static load with the mass of the scribe body remaining heavy. Therefore, it is possible to lower the static load with the dynamic load remaining large, and to provide a scribe apparatus which is fitted to cut the hard brittle material.

In preferred embodiment, the scribing apparatus may further comprises a base for supporting said weight and said scribe body, wherein said scribe body and said weight are attached to the base through rectilinear guides so that said scribe body and said weight being movable in a direction parallel to a direction in which the vibration generation member vibrates.

According to this preferred embodiment, since the scribe body and the weight move without tottering, an appropriate dynamic load can be applied to the work from the cutter.

In preferred embodiment, said static load adjustment device is composed of a pair of floatage applying magnets repulsing each other, which apply a floatage to the scribe body, one of the floatage applying magnets is attached to said scribe body and another one is attached to said base.

According to this preferred embodiment, repulsive force of the pair of floatage applying magnets gives a floatage to the scribe body so that the static load becomes lower.

In preferred embodiment, the scribing apparatus may further comprises a level controlling mechanism changing the height of one of the floatage applying magnets attached to the base. Also, in preferred embodiment, said one of the floatage applying magnets attached to the base is composed of an electromagnet capable of changing a magnetic force.

According to these preferred embodiment, the static load can be appropriately adjusted correspond to the work.

In preferred embodiment, the scribing apparatus may further comprises mass changing device changing mass of said weight or said scribe body. It may be possible to use an additional weight which is added by means such as bolts or adhesive for connecting the additional weight to the scribe body or the weight According to these preferred embodiment, changing the mass of the weight or the scribe -body appropriately adjusts the static load and the dynamic load correspond to the work.

In another aspect of the present invention, there is also provided a scribing apparatus which forms a scribe line on a work comprising, a scribe body having a cutter and a vibration generation member which vibrates the cutter periodically;

an elastic member applying a load to the scribe body so as to prevent the cutter from floating up in the air:

a load transmission device disposed between the spring and the scribe body, said load transmission device transmitting the load from the spring to the scribe body by using magnetic force. It may be possible to use a spring or a rubber or the like as the elastic member.

In a preferred embodiment of this aspect, since the elastic member is deformed as the scribe body vibrates, repulsive magnetic force will not change. Therefore an appropriate dynamic load can be applied to the work from the cutter.

DESCRIPTION OF THE PREFERRED EMBODIMENTS

Figure 1:
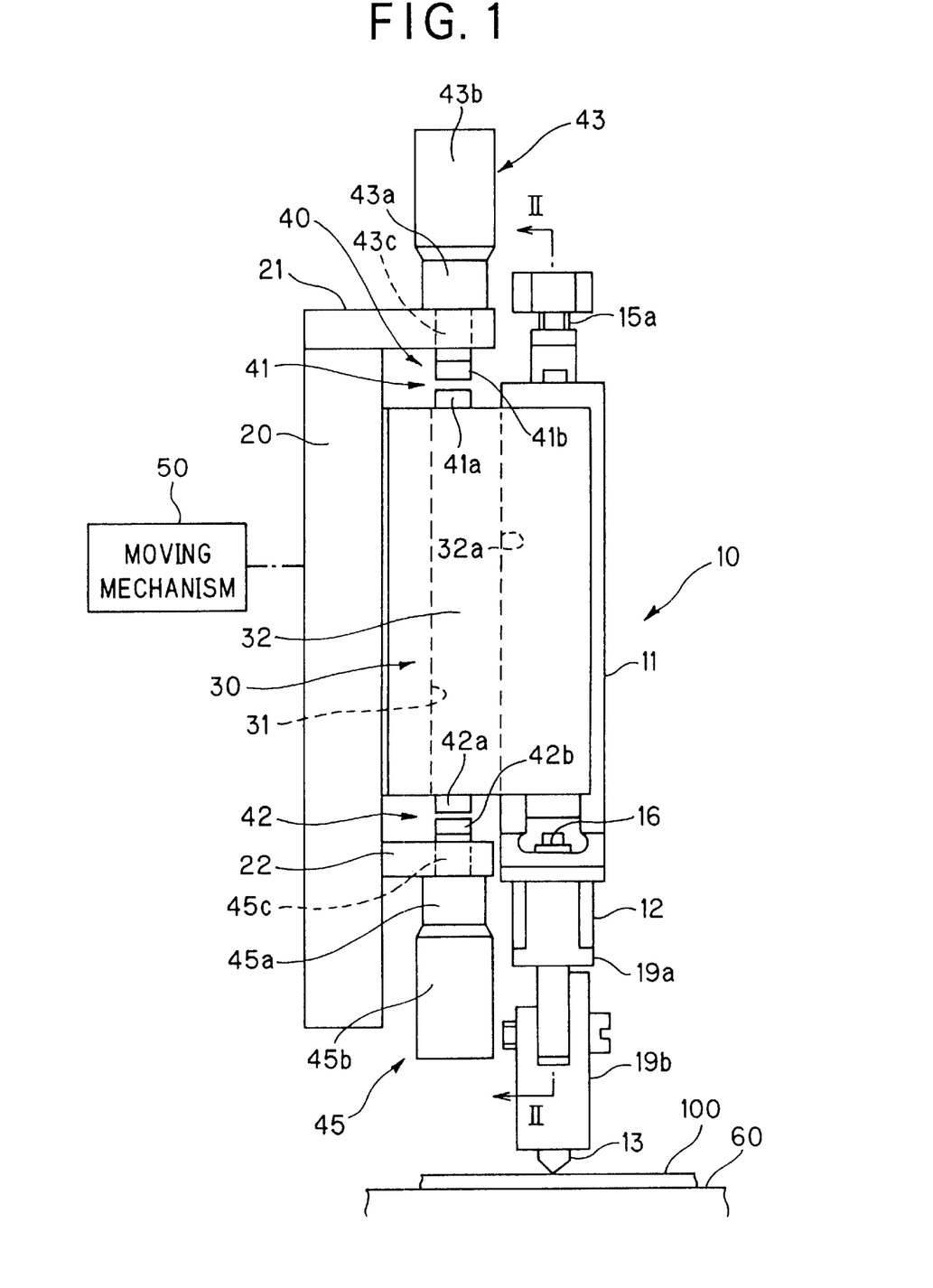
FIG. 1 is a schematic side view showing an entire structure of a scribing apparatus according to a first embodiment of the present invention.

FIG. 1 shows a scribing apparatus according to a first embodiment of the present invention. With reference to FIG. 1, the scribe apparatus comprises a scribe body 10, a base plate (support body) 20 arranged vertically for supporting the scribe body 10 to be movable and having a slide mechanism 30 arranged between the scribe body 10 and the base plate 20 which makes the scribe body 10 to be movable in a vertical direction against the base plate 20, a magnetic force applying means (a magnetically holding mechanism) 40 for holding the scribe body at a standard height (position) by using vertical magnetic force, a moving mechanism 50 moving the base plate 20 in a direction perpendicular to space in FIG. 1, and a table 60 on which plate-shaped work 100 such as plate glass or ceramics plate is placed in a horizontal plane. A support device includes said base plate 20, said slide mechanism 30, and said magnetically holding mechanism 40.

Figure 2:
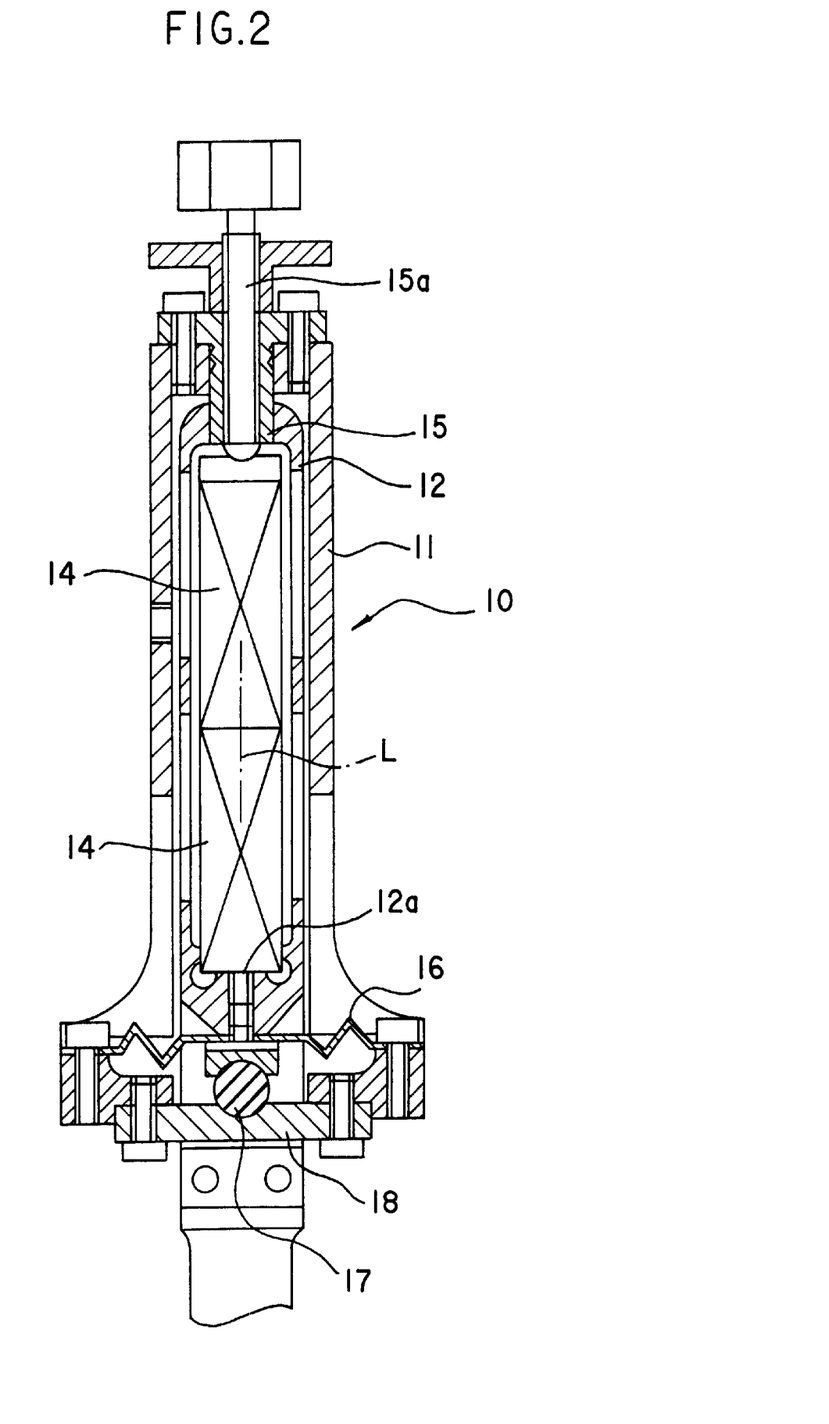
FIG. 2 is a sectional view taken along the line •—• in FIG. 1.

FIG. 2 shows the scribe body 10. The scribe body 10 comprises the body portion 11, a holder 12 supported by the body portion 11 so as to be minutely slidable in the vertical direction, a cutter 13 (head or abutment member, see FIG. 1) attached to the lower end (front end) of the holder 12 and a vibration generation member 14 having two piezo-actuators in series or the like for generating and applying vibrations to the holder 12 in the vertical direction.

The body portion 11 has a vertically elongated box-shaped structure, and the holder 12 is accommodated inside the body portion 11. The holder 12 also has a vertically elongated box-shaped structure, and the vibration generation member 14 is accommodated inside the holder 12. The vibration generation member 14 is extending vertically, and has a central axis in common with axes of the body portion 11 and the holder 12, the central axis (line) being shown as L in FIG. 2. And the vibration is generated along this axial line L. The vibration generation member 14 has a lower end abutting against a bottom surface 12a (abutment surface) of an inner space of the holder 12.

The holder 12 also has an upper end supported by a guide member 15 provided at the upper end of the body portion 11 to be minutely slidable in the direction along the central axis L, i.e. vibrating direction. A lower end of the holder 12 is supported by a plate spring 16 laid across the body portion 11 and a spherical ball 17 (as a pre-load applying member) made of an elastic material such as rubber or resin. And the ball 17 is disposed between a receiver plate 18 fixed to the body portion 11 and the holder 12. The ball 17 acts to urge the holder 12 upward by its elastic restoring force so as to apply the pre-load (a force in a direction to compress the vibration generation member 14 axially) to the vibration generation member 14 arranged between the bottom surface 12a of the inner space of the holder 12 and an adjusting screw 15a screwed to the guide member 15.

The holder 12 has a pair of lower forked extensions extending so as to straddle the plate spring 16, and the cutter 13 is mounted to the lower end (front end) of the paired extensions of the holder 12 through attachments 19a, 19b by which a mounting angle of the cutter 13 is adjustable with respect to the holder 12. The cutter 13 is mounted to a position substantially on the central axis line L of the vibration generation member 14. A lower end portion of the cutter 13 has a conical shape extending downward and is sharp-pointed. The cutter 13 comprises a diamond particle having a substantially quadrangular pyramid shape fixed to the lower end thereof. The apex of the diamond particle points below so as to be put on the surface of the work 100.

The slide mechanism 30 comprises a guide 31 fixed to the base plate 20 so as to extend vertically and a slider 32 supported by the guide 31 to be slidable in the vertical direction. A hollow 32a extending in the vertical direction is formed on the slider 32. And body portion 11 is put in and fixed to the hollow 32. This slider 32 composes one part of the scribe body 10.

The magnetically holding mechanism 40, which is a distinctive feature in the embodiment of the present invention, has a first pair of magnets (another pair of magnets) 41 repulsing each other disposed over the slider 32 and a second pair of magnets (a pair of magnets) 42 repulsing each other disposed under the slider 32.

The first pair of magnets 41 have a permanent magnet 41a fixed to an upper surface of the slider 32 and a permanent magnet 41b opposing to and vertically alienated from the permanent magnet 41a, said permanent magnet 41b being fixed to the base plate 20.

Said permanent magnet 41b is provided as follows. Base plate 20 has a horizontally extending plate 21 fixed to at the upper end thereof, and a position adjustment mechanism (a magnetic force adjustment mechanism) 43 is attached to the horizontally extending plate 21. The structure of the position adjustment mechanism 43 is similar to the structure of a well-known micrometer. And the position adjustment mechanism 43 comprises a sleeve 43a fixed to an upper surface of the horizontally extending plate 21, a manually operated case 43b disposed outside a periphery surface of the sleeve 43a, and a spindle 43c of which a projecting amount is adjustable by rotating the manually operated case 43b. The spindle 43a penetrates the horizontally extending plate 21 and extends downward. The permanent magnet 41b is fixed to the lower end of the spindle 43. Therefore, adjusting the projecting amount of the spindle 43a by rotating the manually operated case 43b allow the position (height) of the permanent magnetic 41b to be adjusted.

The permanent magnets 41a and 41b are opposing to each other so that identical magnetic polarities (for example N polarities) are put face to face. There is a vertical distance between the permanent magnets 41a and 41b. And repulsive force between permanent magnets 41a and 41b urge the scribe body 10 including the slider 32 downward, that is, toward the work 100.

The second pair of magnets 42 also have a permanent magnet 42a fixed to an lower surface of the slider 32 and a permanent magnet 42b, fixed to the base plate 20, opposing to and vertically alienated from the permanent magnet 42a.

Like the first pair of magnets 41a, 41b, the permanent magnet 42b is provided in base plate 20 through a horizontally extending plate 22 fixed at the lower end thereof and a position adjustment mechanism 45 (a magnetic force adjustment mechanism) attached to the horizontally extending plate 22. A sleeve 45a of the position adjustment mechanism 45 is fixed to a lower surface of the horizontally extending plate 22. A spindle 45c projecting upward from the sleeve 45a penetrates the horizontally extending plate 22. The permanent magnet 42b is fixed to the upper end of the spindle 45c. Adjusting the projecting amount of the spindle 45c by rotating the manually operated case 45b allows the position (height) of the permanent magnetic 42b to be adjusted.

The permanent magnets 42a and 42b are also opposing to each other so that identical magnetic polarities are put face to face. And repulsive force between permanent magnets 42a and 42b urge the scribe body 10 including the slider 32 upward apart from the work 100, that is, in a direction in which the scribe body 10 is apart from the work 100.

From the foregoing description, magnetically repelling force applied to the scribe body 10 by said first pair of magnets 41a, 41b and magnetically repelling force applied to the scribe body 10 by said second pair of magnets 42a, 42b are opposing to each other in a vertical direction parallel to a direction in which the vibration generation member 14 vibrates. And the pair of magnets 41a, 41b and the pair of magnets 42a, 42b are aligned in a axial direction extending vertically.

A description of an operation in the scribe apparatus will be given below. As mentioned above, the work 100 is horizontally placed on the table so that the positioning of the work 100 is determined. On the other hand, when the cutter 13 is not put on the work 100, the scribe body 10 is floated by using magnetically repelling force of the pair of magnets 41a, 41b and 42a, 42b in opposite directions and is held at a standard height (position).

The magnetic force applied to the scribe body 10 is determined by the height of magnetic 41b and the height of magnetic 42b adjusted by the position adjustment mechanisms 43, 45. When the scribe body 10 is at the standard height, the total of force caused by the own weight of the scribe body 10 and the repulsive force of the paired magnets 41a, 41b are equal to the repulsive force of paired magnets 42a, 42b. That is, when the scribe body 10 is at the standard height, the repulsive force of the paired magnets 42a, 42b is larger than the repulsive force of the paired magnets 41a, 41b by the weight of the scribe body 10. The standard height of the scribe body 10 is set slightly lower than a height of the scribe body 10 when the scribe body 10 is getting on the work 100 by some amount for example 10·m. Also, the distance between the paired magnets 41a, 41b and the distance between the paired magnets 42a, 42b, when the scribe body 10 is in the standard height, determine restoring force applied to the scribe body 10 displaced out of the standard height.

At first, the scribe body 10 set in the standard height is horizontally apart from the edge of the work 100. By the moving mechanism which moves the scribe body 10 and the base plate 20 to the work 100 horizontally, cutter 13 gets on the work 100 after hitting the edge of the work 100. A distance between the standard height when the scribe body 10 is not placed on the work 100 and the height when the scribe body 10 is getting on the work 100 is determined by the desirable applied static load corresponding to the work 100. And since the distance is not set so larger than a necessary distance, the cutter 13 can easily get on the work 100.

As the cutter 100 gets on the work 100, the scribe body 10 moves upward out of the standard height. According to this displacement of the scribe body 10, the repulsive force of the paired magnets 41a, 41b becomes larger and the repulsive force of the paired magnets 42a, 42b becomes smaller, the scribe body 10 is applied a downward load which restores the scribe body 10 to the standard height. This load as a static load pushes the cutter 13 on the work 100.

The static load is based not only on the weight of the scribe body 10 but also on the repulsive force of paired magnets 41a, 41b, 42a, 42b caused by the displacement of the scribe body 10 out of the standard height. Therefore, adjusting the displacement of the scribe body 10 by the position adjustment mechanisms 43, 45 can appropriately adjust the static load according to a thickness or material of the work 100.

As mentioned above, after the cutter 13 is put on the work 100, the cutter 13 is moved by the moving mechanism so as to draw a locus along the surface of the work 100. When the scribe body 10 gets on the work 100 or before the scribe body 10 gets on the work 100, the two vibration generation members 14, 14 has been applied an in-phase high frequency voltage and are periodically expanded or contracted in the axial direction. A vibration of the holder 12 caused by the periodic expansion and contraction of the vibration generation members 14, 14 is transmitted to the work 100 through the cutter 13. As a result the cutter 13 forms a scribe line consisting of continuous vertical micro-cracks on the surface of the work 100 along the locus thereof.

From the foregoing description, since the static load is changed and made smaller, it is possible to prevent a horizontal cracks from occurring near the scribe line and to form a fine scribe line. By the way, mass which contributes to a vibration energy transmitted from the vibration generating members 14, 14 to the work 100 is determined by mass of the holder 12, the attachment 19a, 19b and the cutter 13. Also, mass which contributes for receiving a reaction force from the vibration generation members 14, 14 is determined by mass of the body portion 11 and the slider 32. Mass are chosen with no relation to the static load so that the mass is sufficiently heavy and the vibration energy is surely transmitted to the work 100 from the cutter 13. Also, a vibration of the body portion 11 and the slider 12 caused by the vibration generation members 14, 14 is absorbed by using the magnetic force of paired magnets 41a, 41b and 42a, 42b without interposing a spring, and it is possible to keep resonance to a minimum.

The work 100 formed the scribe line as mentioned above is removed from the table 60 and is broken along the scribe line with a work breaking apparatus not shown.

It is to be noted that, in the above described embodiment, although permanent magnet was used for the magnetically holding mechanism, an electromagnet may be used for the magnetically holding mechanism. Using the electromagnet, magnetically repelling force can be adjusted by changing an impressed electric current of the electromagnet.

Further, although the first pair of magnets 41a, 41b and second pair of magnets 42a, 42b are arranged parallel to the central axis L of the vibration generation members 14, 14 and shifted therefrom, the first pair of magnets 41a, 41b and second pair of magnets 42a, 42b may be arranged on the central axis L of the vibration generation members 14, 14. Further, it may be possible to apply a pre-load to the vibration generation members 14, 14 by using the pair of magnets in place of the plate spring 16 and ball 17. Further, the cutter 13 may consists of a disk, capable of rotating, having a edge at a periphery thereof.

Figure 3:
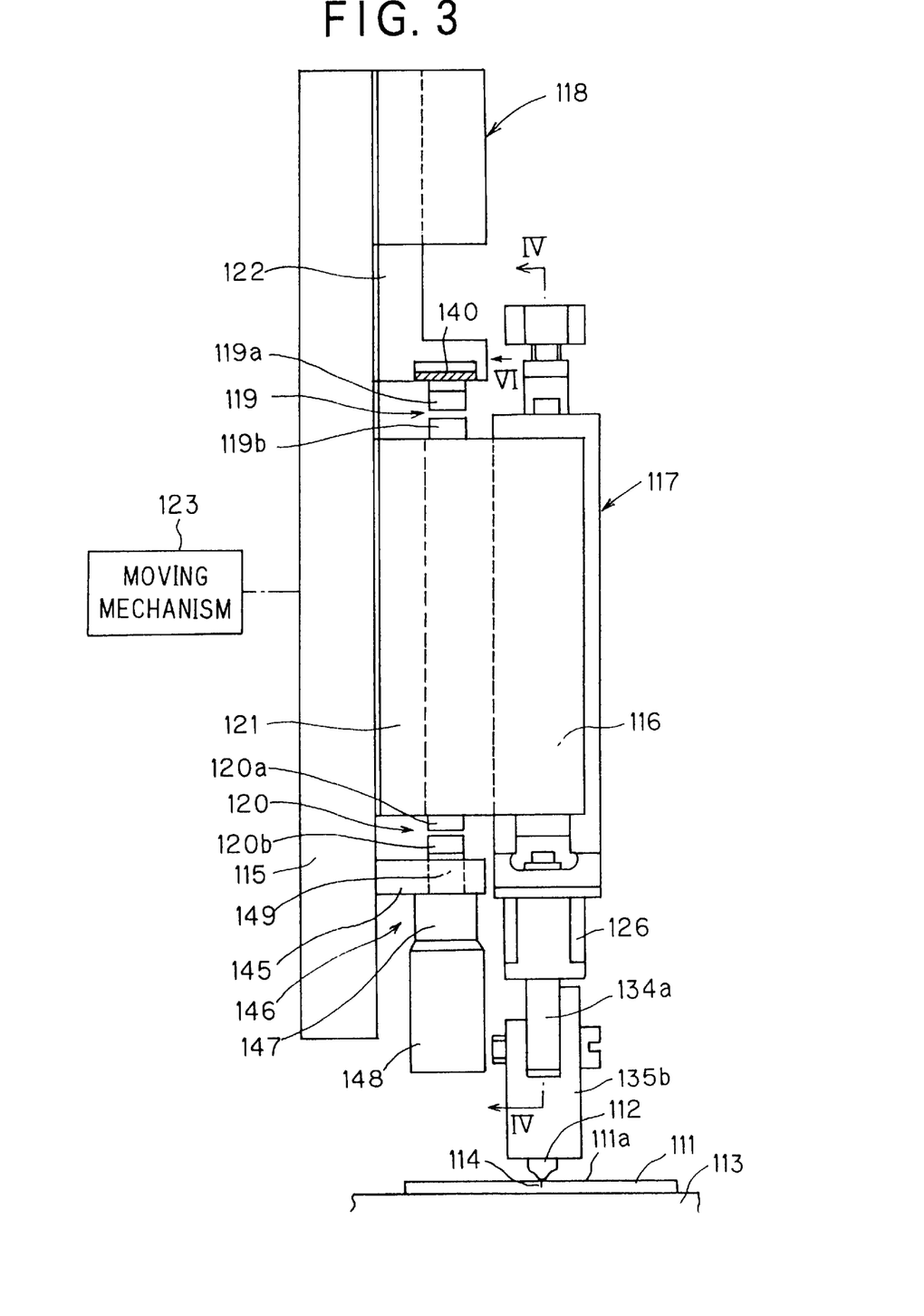
FIG. 3 is a schematic side view showing an entire structure of a scribing apparatus according to a second embodiment of the present invention.

FIG. 3 shows a scribing apparatus according to a second embodiment of the present invention. This scribing apparatus forms scribe line on a thin board-like work 111 made of a hard brittle material such as plate glass, ceramics plate, a semiconductor or the like with a high speed and precision by using the cutter 112 such as a chisel or the like. After the cutter 112 contacts the work 111 which is placed on the table 113, a pressure applied to the work 111 by the cutter 112 is vibrated, consequently the vertical (longitudinal) cracks 114 is generated. The vertical cracks 114 will be applied a force so that the cracks 114 grows, and the work 111 will be broken.

As shown in FIG. 3, this scribing apparatus comprises a base plate (base) 115, a scribe body 117 having a cutter 112 and a vibration generation member 116 which vibrates the cutter periodically, a weight 118 applying a load to the scribe body 117 so as to prevent the cutter 112 from floating up in the air, a pair of load applying magnets 119, 119 repulsing each other as a load transmission means for transmitting a load from the weight 118 to the scribe body 117 by using magnetic force, a pair of floatage applying magnets 120, 120 repulsing each other which apply a floatage to the scribe body 117 as a static load adjustment device adjusting a static load applied to the work 111 from the cutter 112 by using magnetic force. A linear rolling motion guide apparatus (a slide mechanism) such as rectilinear guide 121 is provided between the base plate 115 and the scribe body 117 so that the scribe body 117 is vertically movable in a rectilinear motion relative to the base plate 115. Also, a linear rolling motion guide apparatus (a slide mechanism) such as rectilinear guide 121 is provided between the base plate 115 and the weight 118 so that the weight 118 is movable in a rectilinear motion relative to the base plate 115. The base plate 115 is attached to a moving mechanism 123 so that the scribe body 117 and the weight 118 are horizontally movable in a two dimensions (horizontal plane).

Figure 4:
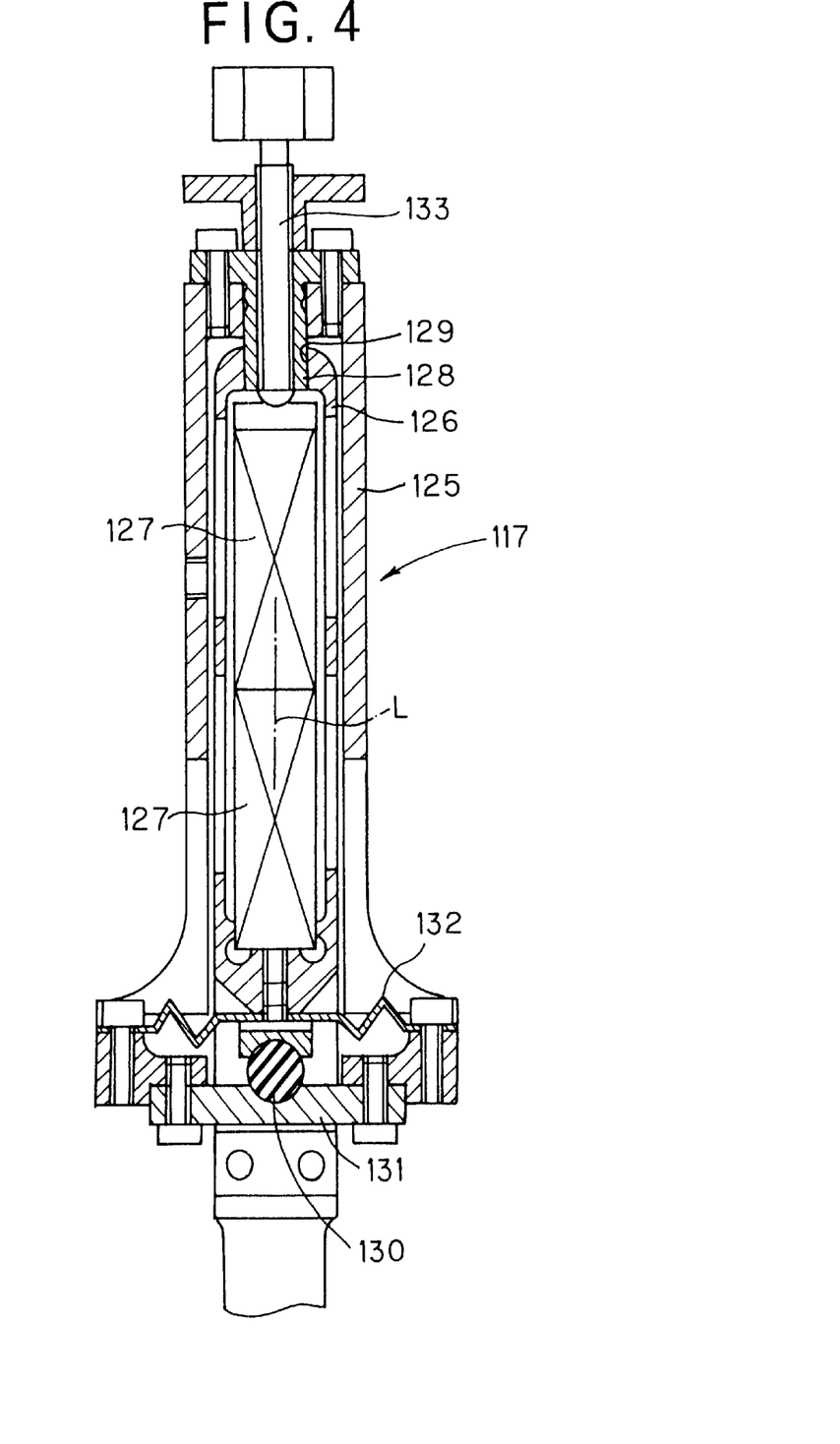
FIG. 4 is a sectional view taken along the line •—• in FIG. 3.

The scribe body 117 has the cutter 112 at a lower end thereof, and vibrates the cutter 112 periodically. FIG. 4 shows the scribe body 117. The scribe body 117 comprises the body portion 125, a holder 126 for holding the cutter 112 supported by the body portion 125 so as to be minutely slidable in the vertical direction, the cutter 112 (see FIG. 3) attached to the lower end of the holder 12 and two piezo-actuators 127, 127 in series or the like for generating and applying vibrations to the holder 12 in the vertical direction as a vibration generation member 14. The body portion 125, the holder 126, and the piezo-actuators 127,127 have the same central line L, and in this embodiment the central line L is in a vertical direction. Applying a high frequency electric field to the piezo-actuators 127, 127 not only expands and contracts the piezo-actuators 127, 127 but also vibrates the cutter 112. These piezo-actuators 127, 127 are combined up and down in series and cooled by cooling air.

The body portion 125 has a vertically elongated box-shaped structure, and the holder 126 is accommodated inside the body portion 11. The holder 126 also has a vertically elongated box-shaped structure, and the piezo-actuators 127, 127 are accommodated inside the holder 126. Projection 128 projecting into the inside of the body portion 125 is provided at an upper end portion of the body portion 125, on the other hand a hole 128 in which the projection 128 fit is made in a upper end portion of the holder 126. A spherical ball 130 which apply a pre-load to the piezo-actuators 127,127 is provided at a lower end of the holder 126. This ball 130 is made of an elastic material such as rubber or resin or the like, and supported by a receiver plate 131. Also a plate spring 132 is disposed over the ball 130 laid across the body portion 125. The ball 130 and the plate spring 132 act to urge the piezo-actuators 127, 127 upward by their elastic restoring force. The pre-load applied to the piezo-actuators 127, 127 is adjusted by rotating a adjustment screw 133 provided at a upper end portion of the body portion 125.

It is to be noted that, although the plate spring 132 and the ball 130 are used for applying the pre-load to the pezo-actuators 127, 127, it may be possible to use a pair of magnets to apply the pre-load to the pezo-actuators 127, 127. Further, it is not limited to the piezo-actuators 127, 127 made of piezoelectric materials for vibrating the cutter 112, and an actuator which vibrates by using the air or applying a magnetic field thereto may be used in place of the piezo-actuators 127, 127.

The holder 126 has a pair of lower forked extensions extending so as to straddle the plate spring 132. As shown in FIG. 3 the cutter 112 is mounted to the lower end of the paired extensions of the holder 126 through attachments 134a, 134b so that a mounting angle of the cutter 112 is adjustable with respect to the holder 126. The lower attachment 134b is capable of turning against the upper attachment 134a, and the mounting angle of the lower attachment 134b is adjustable with respect to the upper attachment 134a. The cutter 112 is disposed on the central line L. A lower end portion of the cutter 112 has a conical shape extending downward and is sharp-pointed. The cutter 112 comprises a diamond particle having a substantially quadrangular pyramid shape fixed to the lower end thereof. The apex of the diamond particle points below so as to be put on the surface of the work 111. It may be possible to use a disk-shaped chisel having an edge at a periphery thereof, and supported by a holder 126 with the chisel rotating.

Figure 5:
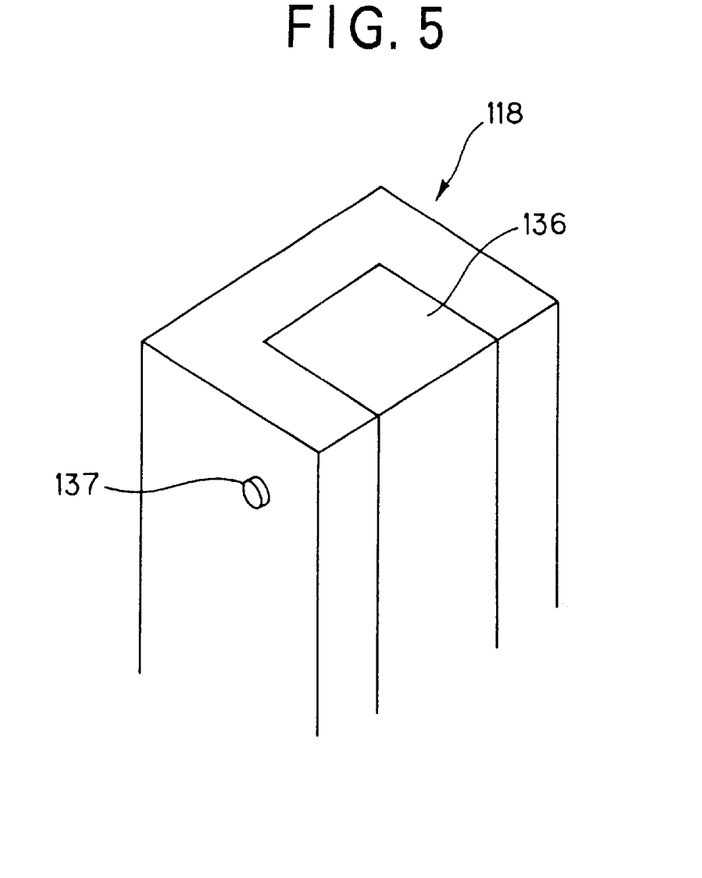
FIG. 5 is a perspective view showing a weight.

The weight 118 applying a load to the scribe body 117 comprises a mass changing device which changes mass of the weight 118. This mass changing device is composed of an additional weight 136 which is added by means such as bolts or adhesive for connecting the additional weight 136 to the weight 118 as shown in FIG. 5. Mass of the additional weight 136 is determined corresponding to the work 111. Also, if the mass of the scribe body 117 is wanted to be changed, an additional weight not shown is added by means such as bolts or adhesive. The mass of the additional weight for the scribe body 117 is also determined corresponding to the work 111.

Figure 6:
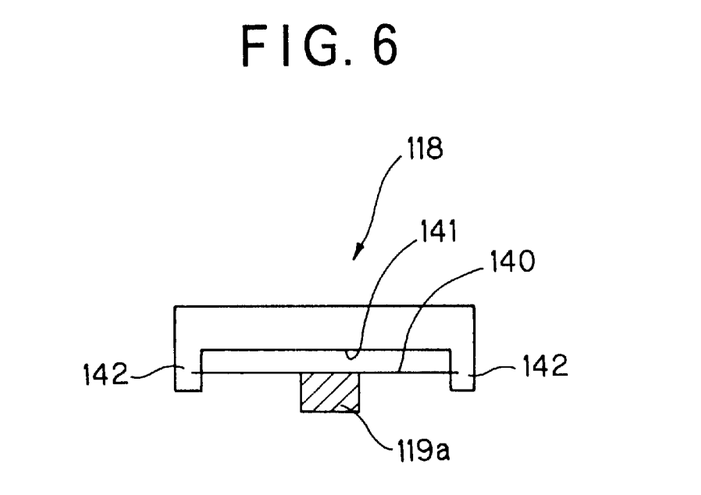
FIG. 6 is a front view showing lower part of the weight.

As shown in FIG. 3, a plate spring 140 is provided under the lower end of the weight 118. FIG. 6 shows the plate spring 140 attached to the weight 118. A hollow 141 is formed on the lower end of the weight 118, and is laid across both edges 142, 142 so that the plate spring 140 is capable of deflecting. And at the center of a lower surface of the plate spring 140, a load applying magnet 119a mentioned later is attached.

Figure 7:
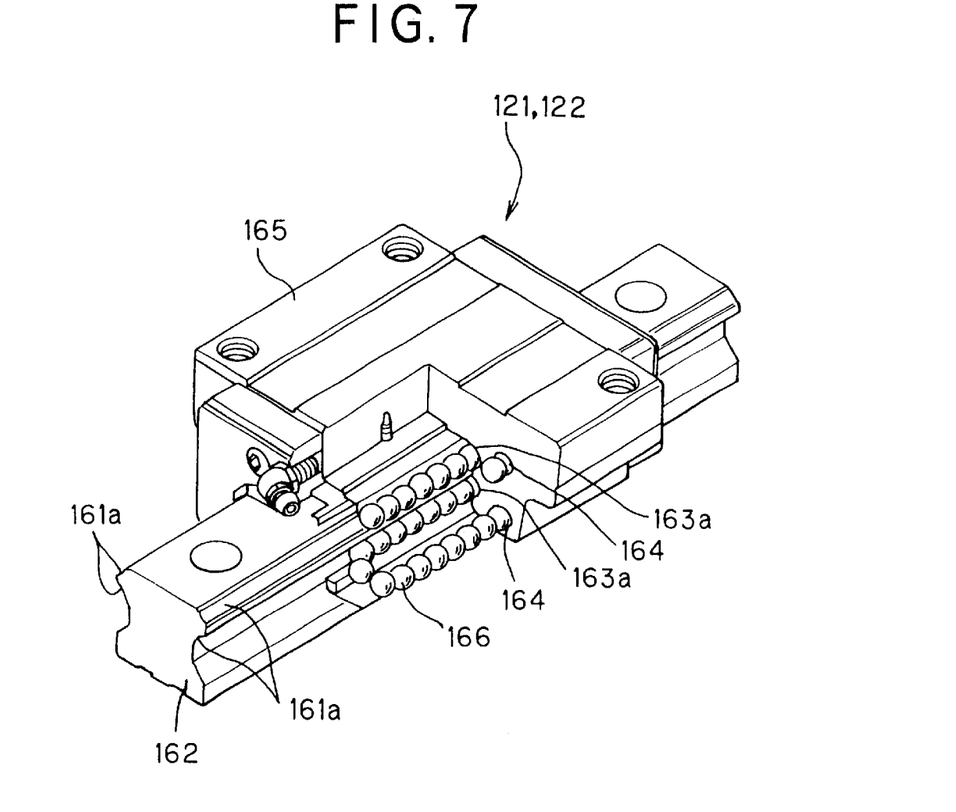
FIG. 7 is a perspective view showing a rectilinear guide.

The scribe body 117 and the weight 118 is attached to the base plate 115 through the rectilinear guides 121, 122. FIG. 7 shows the rectilinear guides 121, 122. This rectilinear guides 121, 122 respectively comprises a guide rail 162 elongated and extending in a vertical direction formed with a ball rolling groove 161a extending along a longitudinal direction thereof, a movable block 165 formed with a ball circulation passage 164 including a loaded ball rolling groove 163a corresponding to the ball rolling groove 161a of the guide rail 162 and assembled with the guide rail 162 to be relatively movable along the guide rail 162, and a number of balls 166, 166, - - - , 166 arranged in the ball circulation passage 164 and circulating therein in conformity with the relative motion of the movable block 165 with respect to the guide rail 162. By arranging the number of balls 166, 166, - - - , 166 between the movable block 165 and the guide rail 162, the movable block 165 moves smoothly. The guide rail 162 is attached to the base plate 115, and the movable block 165 is attached to the scribe body 117 or to the weight 118. The movable block 165 constitutes a part of the scribe body 117 or the weight 118 and contributes to mass of the scribe body 117 or the weight 118. A direction in which the weight 118 rectilinearly moves is consistent with a direction in which the scribe body 117 rectilinearly moves. It is to be noted that rollers may be used in place of the balls 166, 166, - - - , 166.

As shown in FIG. 3, the pair of load applying magnets 119a, 119b as the load transmission means which transmits a load to the scribe body from the weight 118 by using magnetic force are disposed between the scribe body 117 and the weight 118. This pair of magnets respectively are composed of permanent magnet. One of the load applying magnets 119a, 119b is attached to the lower surface of the plate spring 140, and the other of the load applying magnets 119a, 119b is attached to the upper surface of the scribe body 117. Also, the pair of the load applying magnets 119a, 119b are vertically arranged in series opposing to each other so that identical magnetic polarities (for example N polarities) are put face to face. The pair of the load applying magnets 119a, 119b magnets are repulsing each other. Repulsive force caused by the load applying magnets 119a, 119b transmits the load of the weight 118 to the scribe body 117.

The pair of floatage applying magnets 120a, 120b as the static load adjustment device which adjusts a static load applied to the work 111 from the cutter 112 are provided under the scribe body 117. The pair of floatage applying magnets 120a, 120b are respectively composed of a permanent magnet. And one of the floatage applying magnets 120a, 120b is attached to the lower surface of the scribe body 117 and the other is attached to a level controlling mechanism 146 which is provided in a horizontally extending plate 145 projecting from the base plate 115. This level controlling mechanism 146 has the same structure as a well-known micrometer and comprises a sleeve 147 fixed to a lower surface of the horizontally extending plate 149, a manually operated case 148 provided outside the sleeve 147, and a spindle 149 which projects upward from the sleeve 45a by rotating the manually operated case 148. The spindle 149 penetrates the horizontally extending plate 145 and extends upward. The floatage applying magnet 120b is fixed to a upper end surface of the spindle 149. Rotating the manually operated case 148 adjust a projection amount of the spindle 149 and adjust a height of the floatage applying magnet 120b.

The pair of the floatage applying magnets 120a, 120b are also vertically arranged in series so that identical magnetic polarities (for example N polarities) are put face to face and repulsing each other.

Repulsive force of the floatage applying magnets 120a, 120 applies a floatage to the scribe body 117 and adjusts a static load applied to the work 111 from the cutter 112. Also, an electromagnet which is capable of changing a magnetic force may be used in place of the permanent magnet. In case of using the electromagnet, magnetic force, is adjusted by changing a voltage applied to the electromagnet.

Next, how to use the scribe apparatus is explained hereinafter. First mass of the weight 118 and mass of the scribe body 117 are determined according to a material of the work 111 such as gallium arsenide (GaAs)• or glass, or silicon, or the like and a thickness of the work 111. The more heavier mass of the scribe body 117 is, the more larger the dynamic load is, and it is possible to form a deep vertical cracks 114 on the surface 111a of the work 111. Also, since gravity of the weight 118 and gravity of the scribe body added up influence the static load, it has been definite in advance according to the work 111.

Next, work 111 is placed on the horizontal table 113, and the work 111 is located in an appointed position. When the cutter 112 gets on the work 111, the static load is applied to the work 111 by the cutter 112. The height of the floatage applying magnet 120b is adjusted by the level controlling mechanism 146 so that the static load becomes definite according the work 111. Suppose that the floatage applying magnets 120a, 120b are not provided, the static load is equal to the gravity of the weight 118 and the scribe body 117 added up. Providing the floatage applying magnets 120a, 120b decreases the static load by the magnetically repulsive force. If the static load is too large, a horizontal cracks may be generated on the surface 111a of the work 111. Conversely, if the static load is too small, the cutter 112 will float up from the work 111 in the air and have a collision with the work 111 and cause damage to the work 111. Therefore, the static load is carefully determined according to the work 111.

After gaining the definite static load, the piezo-actuators 127, 127 are applied a high frequency voltage (an electric field) and are periodically expanded or contracted in the axial direction. And the work 111 is applied the dynamic load by vibrating the cutter 112. It is to be noted that since the cutter 112 is always contact with the work 111 by the static load, the scribe body 117 itself vibrates.

Figure 8:
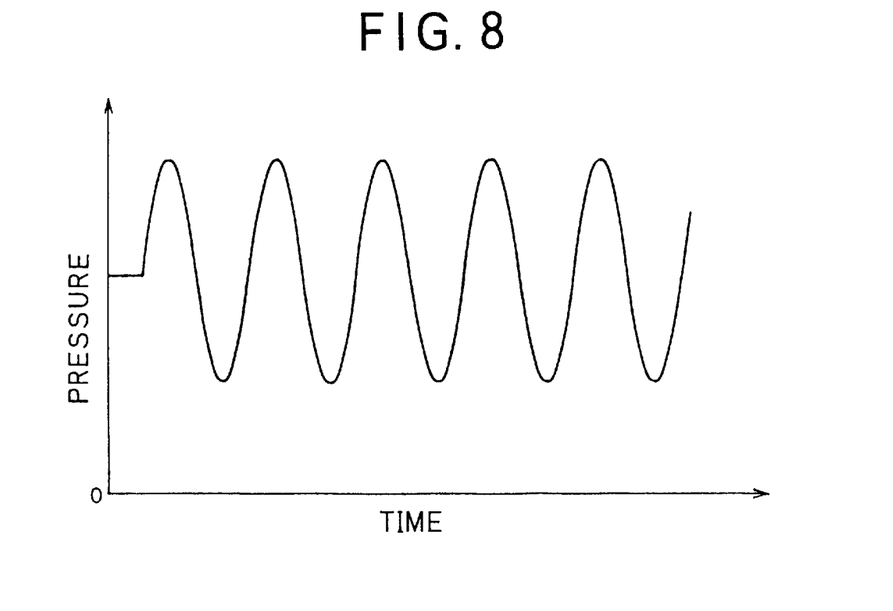
FIG. 8 is a graph showing a pressure applied to the work by a cutter.

FIG. 8 shows a pressure applied to the work 111 by the cutter 112. The pressure vibrates according to the vibration of the scribe body 117. And the mean value of the pressure is the same as the static load. The dynamic load, that is, an amplitude of vibration shown in FIG. 8 is in proportion to the mass of the scribe body 117 (to be exact, the mass of body portion 125 and the slide member 165)

According to this embodiment of the invention, since the weight 118 floated by using the repulsive force of the load applying magnets 119a, 119b vibrates periodically, an interval between the pair of load applying magnets 119a, 119b seldom changes. Therefore the repulsive force of the load applying magnets 119a, 119b seldom changes. Further, since the magnets 119a, 119b are good in attenuation, an attenuation force is applied to the scribe body 117. As a result, it is possible to apply an appropriate dynamic load to the work 111 by the cutter 112. Also, since a spring connecting the weight 118 with the scribe body 117 directly is not provided, the weight 118 will not resonate. Further, when the cutter runs on the work 111, or a thickness of the work 111 has changed, or the work 111 is undulated, since the weight 118 moves and follows the cutter 112, magnetically repelling force seldom changes in these cases.

According to this embodiment of the invention, since the spring 140 and the load applying magnets 119a, 119b are connected in series, the vibration of the scribe body 117 will be complex, and it will be possible to apply a complex dynamic load vibrating to the work 111 from the cutter 112. Therefore, deep vertical cracks can be formed even on the materials such as silicon and so forth that are difficult to be formed a scribe line with a sine wave.

According to this embodiment of the invention, since the scribing apparatus comprises the static load adjustment device adjusting a static load applied to the work 111 from the cutter 112, it is possible to lower the static load with the mass of the scribe body remaining heavy. Therefore, it is possible to lower the static load with the dynamic load remaining large, and to provide a scribe apparatus which is fitted to cut the hard brittle material.

The base plate 115 is horizontally moved by the moving mechanism 123. And the scribe line being composed of vertical cracks formed on the surface 111a of the work 111. The work 111 formed the scribe line as mentioned above is removed from the table 113 and is broken along the scribe line with a work breaking apparatus not shown.

In one preferred example performed by the applicant, the scribe apparatus of a second embodiment was used. In the test result, the vertical cracks formed by the scribe apparatus was about 500·m exceedingly deep to about 7·m wide. And it was confirmed that the surface 111a of the work 111 was not damaged.

What is claimed is:

1. A scribing apparatus which forms a scribe line on a work placed in a horizontal plane, comprising:

a scribe body having a cutter and a vibration generation member which vibrates the cutter periodically;

a support device having a support body for slideably supporting the scribe body to be movable in a vertical direction;

a pair of magnets repulsing each other disposed between the support body and the scribe body to provide a magnetically repelling force, wherein the pair of magnets apply a floatage to the scribe body by using said magnetically repelling force; and another pair of magnets repulsing each other disposed between the support body and the scribe body to provide a magnetically repelling force opposing to said magnetically repelling force of said pair of magnets.

2. A scribing apparatus according to claim 1, further comprising: a magnetic force adjustment mechanism which adjusts magnetically repelling force by changing a position of at least one magnet of either of the pairs of magnets.

3. A scribing apparatus according to claim 1, wherein at least one magnet of either of the pairs of magnets is composed of an electromagnet, and magnetically repelling force is adjusted by changing an impressed electric current of said electromagnet.

4. A scribing apparatus which forms a scribe line on a work placed in a horizontal plane, comprising:

a scribe body having a cutter and a vibration generation member which vibrates the cutter periodically;

a support device having a support body for slideably supporting the scribe body to be movable in a vertical direction;

a pair of magnets repulsing each other, one of said pair of magnets being disposed on the scribe body and another one of said pair of magnets being disposed on the support body, wherein the pair of magnets apply a floatage to the scribe body by using magnetically repelling force, and another pair of magnets repulsing each other, one of said another pair of magnets being disposed on the scribe body and another one of said another pair of magnets being disposed on the support body, wherein magnetically repelling force applied to the scribe body by said another pair of magnets and magnetically repelling force applied to the scribe body by said pair of magnets opposing to each other are in a direction parallel to a direction in which the vibration generation member vibrates.

5. A scribing apparatus which forms a scribe line on a work placed in a horizontal plane, comprising a scribe body having a cutter and a vibration generation member which vibrates the cutter periodically;

a support device having a support body for slideably supporting the scribe body to be movable in a vertical direction; and a pair of magnets repulsing each other disposed between the support body and the scribe body adjusting a static load applied to the work from the cutter, wherein the pair of magnets apply a floatage to the scribe body by using magnetically repelling force, and another pair of magnets repulsing each other, disposed between the support body and the scribe body, wherein magnetically repelling force applied to the scribe body by said another pair of magnets and magnetically repelling force applied to the scribe body by said pair of magnets opposing to each other are in a direction parallel to a direction in which the vibration generation member vibrates.

* * * * *